United States Patent [19]

Mercier

[11] 4,122,326
[45] Oct. 24, 1978

[54] METHOD OF WELDING A SPIRAL SPRING TO PRODUCE A TOROIDAL RING
[75] Inventor: Bernard Mercier, Houilles, France
[73] Assignee: Le Joint Francais S.A., Paris, France
[21] Appl. No.: 734,274
[22] Filed: Oct. 20, 1976
[30] Foreign Application Priority Data
  Oct. 24, 1975 [FR] France .............................. 75 32617
[51] Int. Cl.² .............................................. B23K 11/02
[52] U.S. Cl. ...................................... 219/104; 219/58; 219/107
[58] Field of Search .................. 219/104, 107, 57, 58; 261/167
[56] References Cited
  U.S. PATENT DOCUMENTS

| | | | |
|---|---|---|---|
| 2,018,380 | 10/1935 | Pfeiffer | 219/107 |
| 2,766,983 | 10/1956 | Taylor | 219/58 X |
| 3,190,633 | 6/1965 | Jacks | 267/167 |
| 3,259,969 | 7/1966 | Tessman | 219/104 X |
| 3,482,462 | 12/1969 | Dahlem | 267/167 X |

OTHER PUBLICATIONS

Welding Handbook Sixth Edition, 1969, AWS, New York, N.Y., pp. 536–537.
The Welding Handbook, 1942, p. 366.

*Primary Examiner*—E. A. Goldberg
*Attorney, Agent, or Firm*—Haseltine, Lake, & Waters

[57] ABSTRACT

A toroidal ring made from a spiral spring with contiguous turns, such as those used for constituting the inner core of a metal sealing ring. The ring has a weld without filling metal connecting together the two end turns of the spring, this weld being such that continuity of the wire of the spring is provided without altering the contiguous configuration of the turns and the mechanical, physical and chemical properties of the spring are substantially unchanged at this weld. The weld can advantageously be effected by a resistance weld performed with a pulse of electric current.

5 Claims, 5 Drawing Figures

METHOD OF WELDING A SPIRAL SPRING TO PRODUCE A TOROIDAL RING

FIELD OF THE INVENTION

The present invention relates to a toroidal ring made from a spiral spring having contiguous turns and to a method of producing the ring.

BACKGROUND

Numerous applications are found for such toroidal rings in various fields. According to the type of use, several manufacturing methods have been implemented, such as screwing, conical fitting or even soldering. If the conditions of use are particularly severe, as is the case, for example, when the toroidal ring constitutes the inner core of a metal sealing ring having at least an outer sheath, known manufacturing methods are no longer suitable.

Indeed, screwing always leaves a residual gap breaking the continuity of the turns; after a great number of cycles of cyclic stresses such as dismantling and assembling, putting under pressure or under vacuum, raising and lowering of temperature, this gap allows plastic deformation which could impair sealing. The conical fitting has the same disadvantage, a residual gap being inevitably formed. Soldering would perhaps give better results, but it remains a very limited method suitable only for applications where temperature do not exceed approximately 120° C.

SUMMARY OF THE INVENTION

The present invention aims at providing a toroidal ring made from a spiral spring with contiguous turns, capable of withstanding severe conditions of use, without having the disadvantages of rings in the prior art, in particular without any residual gap or appreciable modification of the characteristics of the spring. The invention also aims at providing a method of obtaining such a toroidal ring.

The present invention provides a toroidal ring made from a spiral spring with contiguous turns, wherein the ring has a weld without filling metal joining the two end turns of the spring, this weld being such that the continuity of the wire of the spring is provided without alteration of the contiguous configuration of the turns and that the mechanical, physical and chemical properties of the spring are substantially unchanged at this weld.

The present invention also provides a method of producing a toroidal ring from a spiral ring with contiguous turns wherein the two ends of the spring are positioned so that the end turns face each other in strict alignment along a common axis and these turns are then pressed against each other simultaneously with the passing of a current having high intensity in the contact zone so as to form an instantaneous resistance weld.

The method can also have at least one of the following characteristics:

The initial positioning is such that the two end turns take part in the instantaneous resistance weld only on a small portion of their length.

After the instantaneous welding phase, the weld zone is subjected to annealing, the applied pressure remaining the same.

BRIEF DESCRIPTION OF THE DRAWING

Other characteristics and advantages will appear more clearly from the following description, given by way of an illustrative example having no limiting character, with reference to the figures of the accompanying drawing, in which.

An embodiment of the invention is described by way of example with reference to the accompanying drawing in which.

DETAILED DESCRIPTION

Figure 1:
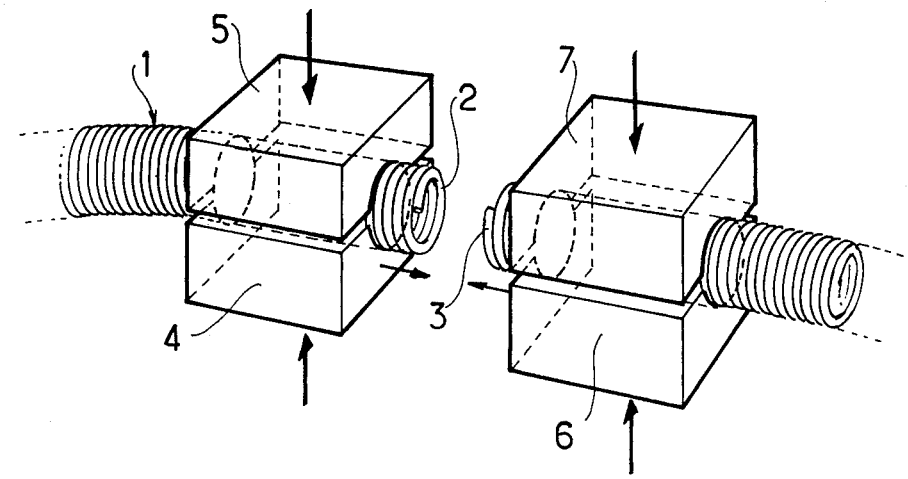
FIG. 1 is a schematic perspective view showing a positioning phase of the ends of the spring prior to assembly.

In FIG. 1, a spiral spring 1 with contiguous turns is turned back on itself to form a loop and its two ends are positioned so that the end turns 2, 3 face each other and are in strict alignment along a common axis. The necessary means for effecting this accurate positioning are conventional and are known to one skilled in the art. A positioning effected by tightening both the ends of the spring between two jaws 4, 5 and 6, 7, while allowing the last turns to protrude has been illustrated by way of example. The arrows show the clamping of the jaws and the direction of movement of the ends of the spring which are thus strictly positioned.

Figure 2A:
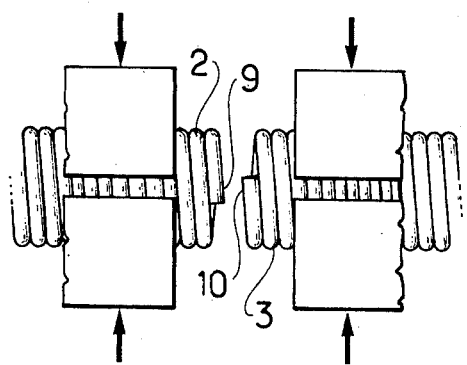
FIGS. 2a and 2b are side views of the end of the spring at two phases during assembly.
Figure 2B:
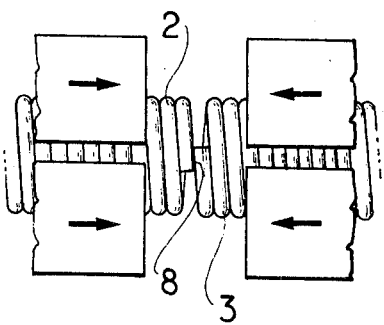

FIGS. 2a and 2b show the turns 2, 3 after the initial positioning phase being pressed against each other simultaneously with the passing of a high current through a small contact zone 8, so as to effect an instantaneous resistance weld. The means used which have been outlined are known to one skilled in the art and a known type of cylinder appropriate for maintaining the pressure can be used. The means for applying the welding current have not been illustrated, as that technique is known, for example, in the field of butt welding of cables.

It is advantageous to so arrange the initial positioning that the two end turns 2, 3 take part in the instantaneous resistance welding only a small portion 9, 10, of their length as shown in FIG. 2b. For this purpose, the cuts at the ends of the spring must be precisely positioned so as to render unnecessary any initial twisting which would be undesirable; this is why the use of a magnifying lens is often necessary to have a strict positioning, especially if the cross-section of the wire is very small.

It is also advantageous to adjust the intensity of the current and the duration of application thereof, this duration generally being in the order of 1/100 of a second, so that only the two end turns 2, 3 are included in the weld, and not the other adjacent turns.

Further, it will almost always be necessary, if the conditions of use are severe, to subject the weld zone to annealing, after the instantaneous resistance welding phase, the application pressure being maintained so that the turns will be contiguous.

Figure 3:
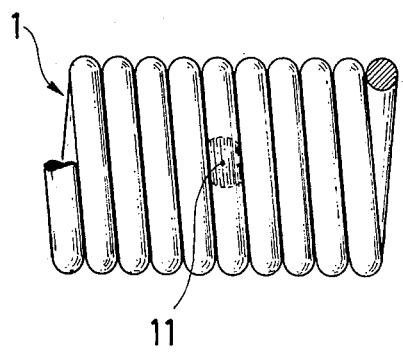
FIG. 3 is a side view of the toroidal ring obtained, showing the weld zone.

The toroidal ring produced by this method, such as it is shown in FIG. 3 is in compliance with the invention: it has a weld 11 joining the two end turns of the spring without any filling metal, this weld being such that the continuity of the wire of the spring is provided without altering the contiguous configuration of the turns and that the mechanical, physical and chemical properties of the spring are substantially unchanged at this weld. If the overlapping zones taking part in the weld are adjusted with precision, the weld 11 has practically no local swelling. However, the toroidal ring produced by this method is perfectly recognizable in relation to toroidal rings of the prior art: there is no filling metal in the weld; there is no deformation and the geometrical shape remains intact; also a surface oxidation limited to the weld zone can be observed.

Figure 4:
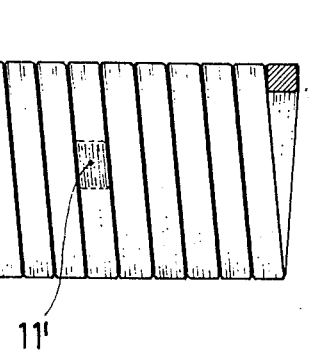
FIG. 4 is a variant with the spring wire having a square cross-section.

The present invention remains very general and is in no way to be limited to the examples thereof which are given purely by way of illustration. Thus, numerous types of spiral springs with contiguous turns can be used: a spring with a wire whose cross-section is round has been illustrated, but a square or rectangular cross-section is perfectly possible. Thus, in FIG. 4, a toroidal ring made from a spring 1' with a wire having a square cross-section and a weld 11' is shown. The largest dimension of the cross-section can range from 0.3 to 4 mm. Numerous component metals can be used; e.g. tungsten, titanium, stainless steels, carbon steels and refractory steels.

The method of producing the toroidal ring according to the invention, in which the weld is formed by instantaneous resistance welding, has been set forth by way of example because it is simple to implement. But it is possible to use other forming methods, such as a laser welding method, for example.

What I claim is:

1. A method for producing a toroidal ring from a spiral spring with contiguous turns by joining together the two ends of said spring, said method comprising positioning the two ends of the spring so that the respective end turns face each other in exact alignment with an overlap between a small end portion of said turns, pressing said end turns against each other with only their respective small end portions in contact, and simultaneously welding said small end portions together by passing a current therethrough and controlling the duration and intensity of the current so that the wire of the spring becomes continuous throughout the toroidal ring and all the turns of the toroidal ring are in a contiguous configuration with the geometric shape of the region of the weld being the same as the other portions of the turns of the spring.

2. A method according to claim 1, wherein the small end portions pressed against each other are welded together by passing a current having a high intensity in the contact zone so as to form an instantaneous resistance weld.

3. A method according to claim 1, wherein the small end portions are subjected to annealing after they are welded together.

4. A method according to claim 1 wherein the small end portions of the end turns which are in contact with one another represent a very minor portion of the length of a winding.

5. A method as claimed in claim 1 wherein said small end portions are so welded together to cause the end turns to merge together in alignment and form a continuous winding without addition of filling material.

* * * * *